United States Patent Office.

L. F. ROBERTSON, OF WEST FARMS, NEW YORK.

*Letters Patent No.* 77,099, *dated April* 21, 1868; *reissue No.* 2,947, *dated May* 26, 1868.

IMPROVED COMPOUND FOR TREATING HIDES AND SKINS.

The Schedule referred to in these Letters Patent and making part of the same.

TO ALL WHOM IT MAY CONCERN:

Be it known that I, L. F. ROBERTSON, of West Farms, in the county of Westchester, in the State of New York, have invented a new and improved Compound for Treating Hides and Skins; and I do hereby declare the following to be a full, clear, and exact description thereof, which will enable those skilled in the art to make and use the same.

This invention relates to a compound of lime, molasses, carbonate of soda, and fish-oil, or train-oil, for the purpose of treating hides and skins in such a manner that the operation of unhairing said hides and skins, and the subsequent operation of tanning the same, are materially facilitated.

The proportion in which I mix the above-named ingredients together is about as follows: Lime, twelve parts; carbonate of soda, twelve parts; molasses, four parts; fish-oil, three parts.

The compound thus obtained is fit for green hides and skins.

For dry hides and skins, I alter the proportion of the ingredients as follows: lime, six parts; carbonate of soda, twelve parts; molasses, three parts; fish-oil, two parts.

These proportions must, however, be changed according to the season, and the nature of the hides or skins to be treated.

In preparing my compound, I dissolve the lime in a small quantity of water, then I add the other ingredients under constant agitation, and at a gentle heat, until the mass is intimately mixed.

The compound thus obtained can be used with great advantage for unhairing hides and skins, and it materially shortens the time required for tanning, since, by its use, the tedious operation of liming the hides and skins is rendered superfluous, and, furthermore, by the action of my compound, the hides and skins are predisposed for the action of the tanning-materials.

Having thus described my invention, what I claim as new, and desire to secure by Letters Patent, is—

A compound for treating hides and skins, made of the materials herein described.

L. F. ROBERTSON.

Witnesses:

W. HAUFF,

E. F. KASTENHUBER.